US011493159B2

(12) United States Patent
Taylor

(10) Patent No.: US 11,493,159 B2
(45) Date of Patent: Nov. 8, 2022

(54) PIPE FITTINGS

(71) Applicant: Flash Line Technologies Inc., Riverton, UT (US)

(72) Inventor: Jason G. Taylor, Riverton, UT (US)

(73) Assignee: FLASH LINE TECHNOLOGIES INC., Riverton, UT (US)

( * ) Notice: Subject to any disclaimer, the term of this patent is extended or adjusted under 35 U.S.C. 154(b) by 167 days.

(21) Appl. No.: 16/871,177

(22) Filed: May 11, 2020

(65) Prior Publication Data
US 2020/0370687 A1     Nov. 26, 2020

Related U.S. Application Data
(60) Provisional application No. 62/851,885, filed on May 23, 2019.

(51) Int. Cl.
| | | |
|---|---|---|
| F16L 37/091 | (2006.01) | |
| F16L 21/08 | (2006.01) | |
| F16L 21/03 | (2006.01) | |

(52) U.S. Cl.
CPC ............... *F16L 21/08* (2013.01); *F16L 21/03* (2013.01)

(58) Field of Classification Search
CPC ......... F16L 21/08; F16L 21/03; F16L 37/084; F16L 37/091; F16L 37/0925; F16L 37/092
USPC ............................ 285/81, 340, 307, 308, 309
See application file for complete search history.

(56) References Cited

U.S. PATENT DOCUMENTS

| | | |
|---|---|---|
| 2,939,729 A | 6/1960 | O'Shaughnessy, Jr. |
| 3,312,484 A | 4/1967 | Davenport |
| 3,398,977 A | 8/1968 | Yoneda |
| 3,591,205 A | 7/1971 | Hamburg |
| 3,633,944 A * | 1/1972 | Hamburg .............. F16L 19/086 439/321 |
| 4,138,145 A | 2/1979 | Lawrence |

(Continued)

FOREIGN PATENT DOCUMENTS

| | | |
|---|---|---|
| CA | 2932714 | 9/2018 |
| EP | 1748242 A1 | 1/2007 |
| EP | 2435744 B1 | 10/2013 |

OTHER PUBLICATIONS

Canadian Office Action from CA Application No. 2932714, dated Jun. 27, 2017.

(Continued)

*Primary Examiner* — Aaron M Dunwoody
(74) *Attorney, Agent, or Firm* — Workman Nydegger

(57) ABSTRACT

A pipe connector includes a housing body defining an axial bore arranged to receive a pipe section having an end and extending between a housing top and a housing bottom. A sealing member is seated in the axial bore with a conical inner surface configured to interface with the end of the pipe section. A cap member with an opening is threadedly attachable to the housing top. A locking member is carried in the cap member and configured such that the pipe section is only movable through the locking member in a direction toward the sealing member. The locking member drives the pipe section downward along the conical inner surface and creates a fluid tight seal between the sealing member and the pipe section when the cap member is threaded down on the housing top with the end of pipe section engaging the conical inner surface of the sealing member.

19 Claims, 4 Drawing Sheets

(56) References Cited

U.S. PATENT DOCUMENTS

| | | | |
|---|---|---|---|
| 4,146,254 A | 3/1979 | Turner et al. | |
| 4,637,636 A | 1/1987 | Guest | |
| 4,878,697 A | 11/1989 | Henry | |
| 5,005,877 A | 4/1991 | Hayman | |
| 5,176,413 A | 1/1993 | Westman | |
| 5,957,509 A | 9/1999 | Komolrochanaporn | |
| 6,264,250 B1 | 7/2001 | Teraoka et al. | |
| 6,502,865 B1 | 1/2003 | Steele | |
| 6,685,230 B1 | 2/2004 | Bottura | |
| 6,824,172 B1 | 11/2004 | Komolrochanaporn | |
| 7,549,679 B2 * | 6/2009 | Brosius | F16L 19/086 285/248 |
| 8,801,048 B2 | 8/2014 | Morris et al. | |
| 9,068,680 B1 | 1/2015 | Crompton et al. | |
| 9,086,179 B1 | 7/2015 | Komolrochanaporn | |
| 9,784,393 B2 | 10/2017 | Taylor | |
| 10,047,884 B2 | 8/2018 | Taylor | |
| 10,641,420 B2 | 5/2020 | Taylor | |
| 2004/0178630 A1 | 9/2004 | Davidson | |
| 2009/0236851 A1 | 9/2009 | Hampel et al. | |
| 2011/0012350 A1 | 1/2011 | Camozzi et al. | |
| 2012/0174374 A1 | 7/2012 | Crompton et al. | |
| 2013/0168959 A1 | 7/2013 | Turk | |
| 2014/0203552 A1 | 7/2014 | Guzowski et al. | |
| 2015/0308590 A1 | 10/2015 | Liang | |

OTHER PUBLICATIONS

International Search Report from PCT Application No. PCT/US2014/068113, dated Mar. 16, 2015.

"2014 Sharkbite Catalog", Reliance Worldwide Corporation, May 2014, 28 Pages.

* cited by examiner

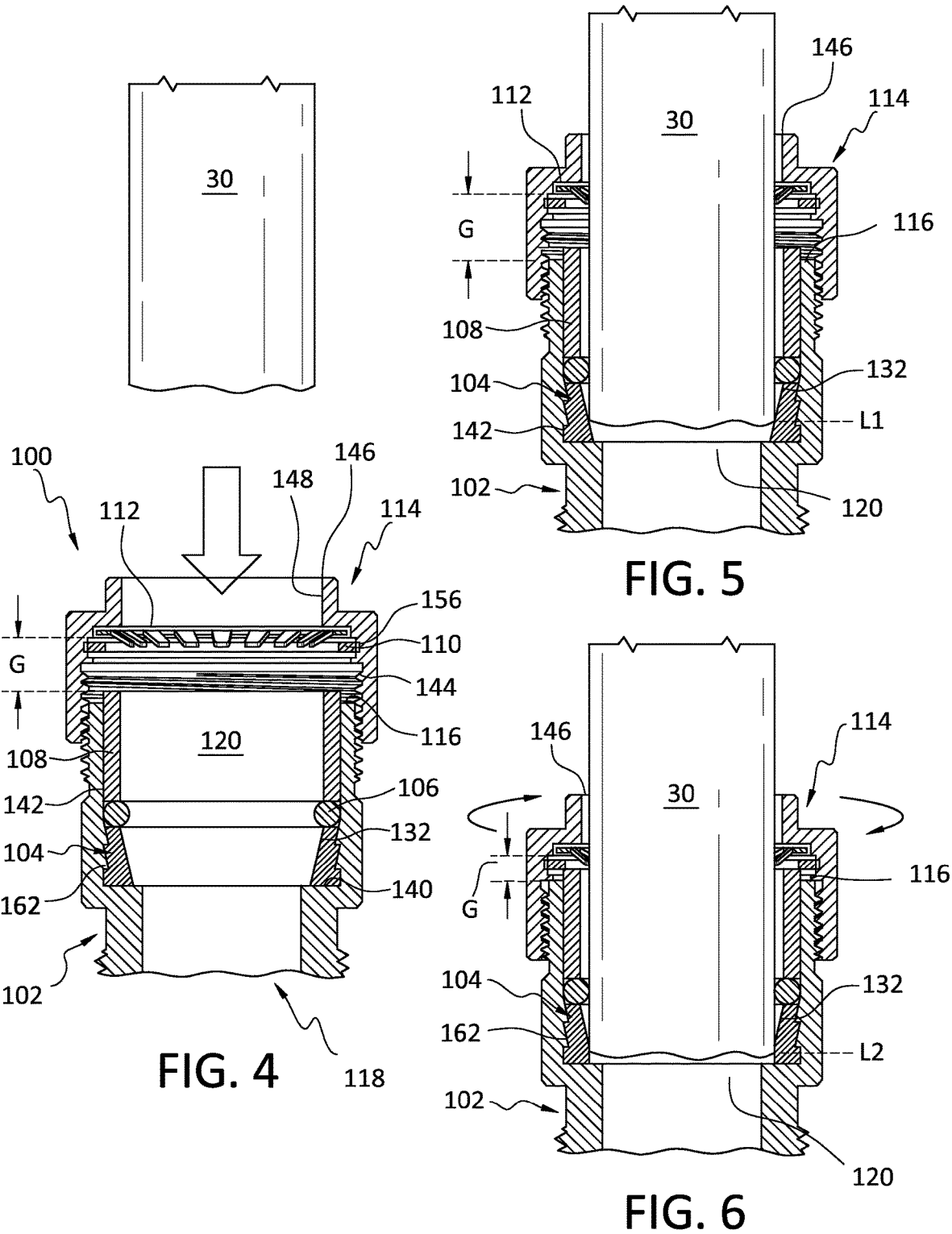

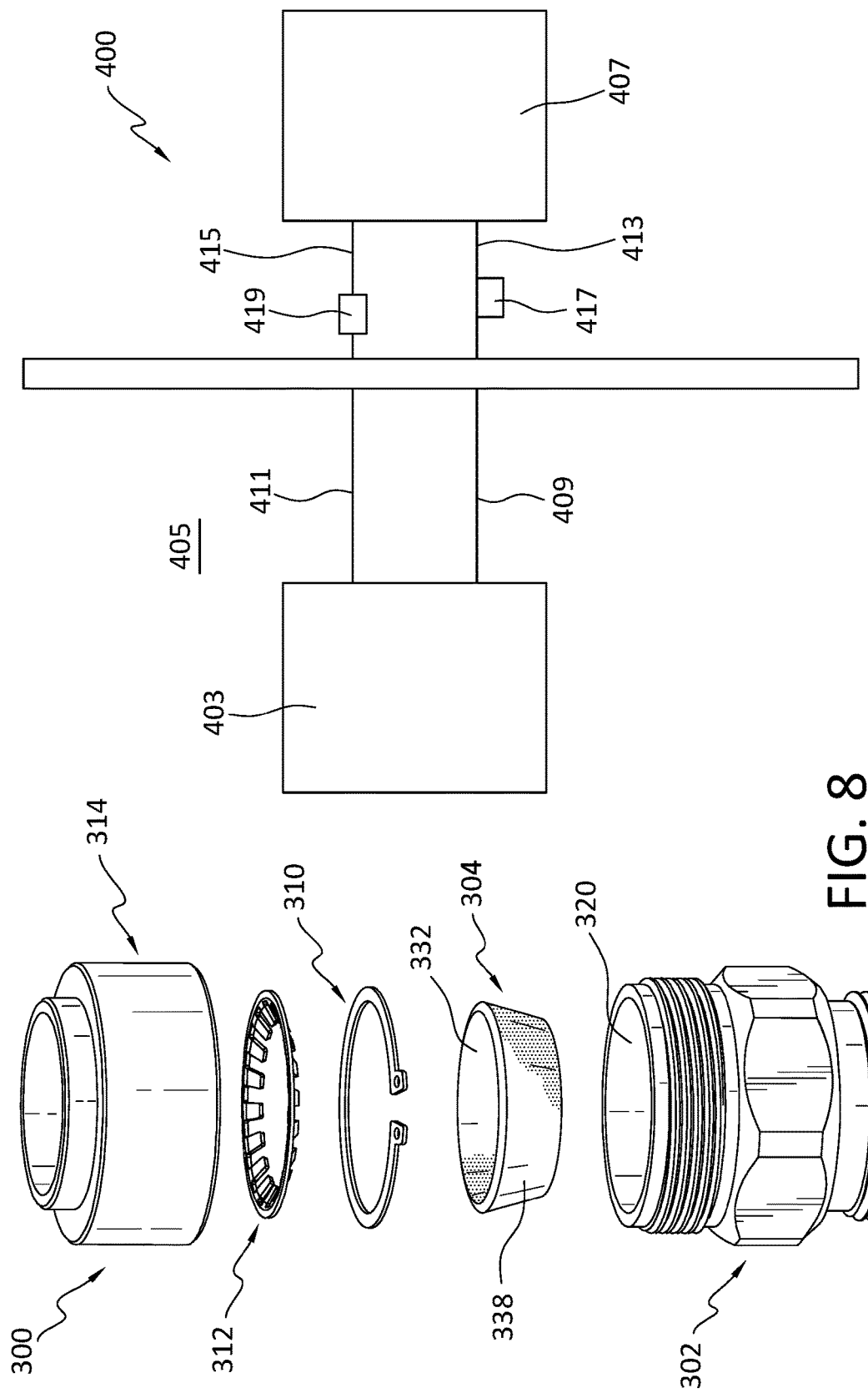

PIPE FITTINGS

TECHNICAL FIELD

The disclosure pertains to components used in connections of pipes or hoses.

BACKGROUND

Plastic and metal pipes have long been used for the conveying of fluids such as liquids and gases. These pipes can include connectors or fittings utilized to connect different sections of pipe. Such fittings must be capable of providing a fluid tight seal over a range of temperatures, pressures and a variety of exterior ambient conditions. For instance, air conditioning systems for office buildings and residential buildings often include an indoor unit and an outdoor unit that are connected by a gaseous refrigerant pipe and a liquid refrigerant pipe to form a refrigerant circuit. These refrigerant pipes are commonly copper pipes utilizing copper fittings, such as standard couplings, tees, and elbows, to connect respective lengths of each pipe together. Typically, in this type of connection neither the lengths of copper pipe nor the fittings have threads. Instead, the fittings have openings designed to receive and surround the entire circumference of the end portion of the pipe such that the pipe is held snugly against the interior surfaces of the opening in the fitting. A flux/solder combination or solder is then used to create a fluid-tight seal between the fitting and the length of pipe.

This type of connection tends to suffer from several drawbacks. For example, soldering the pipe and fitting together can be time consuming and labor intensive. Consequently, the cost of connecting the pipes can be expensive. Additionally, due to space restrictions or other conditions related to the soldering work, connecting the pipe and fittings can be hazardous and/or present a fire danger. In many situations the fitting is soldered onto the pipe at a distance that is only inches away from a building. Another drawback of this connection system is that a user cannot solder a pipe with moisture in the pipe because steam will develop and pressurize the pipe so that the solder does not flow in between the pipe and the fitting.

Some attempts have been made to use conventional fittings for making connections with refrigerant pipes. However, such attempts have been unsuccessful for a variety of reasons, including the fact that refrigeration pipe is not consistently round with any degree of reliable tolerance. For example, a ⅞" refrigerant pipe (0.875 inch) can be found to vary significantly in minimum and maximum outer diameters. Sometimes refrigerant pipes have an oval shape with a broad range of diameters (e.g., a 0.875-inch refrigerant pipe can range from 0.900 to 0.830-inch on the same cross section). This variable and/or inconsistent shape in the refrigeration pipe can make the use of such conventional fittings unreliable and prone to leaking, especially at high pressures.

SUMMARY

According to an embodiment, a pipe connector includes a housing body defining an axial bore arranged to receive a pipe section having an end and extending between a housing top and a housing bottom. The end of the pipe section can comprise a cut-off end having irregularities. A sealing member is seated in the axial bore with a conical inner surface configured to interface with the end of the pipe section. A cap member with an opening is threadedly attachable to the housing top. A locking member is carried in the cap member and configured such that the pipe section is only movable through the locking member in a direction toward the sealing member. The locking member drives the pipe section downward along the conical inner surface and creates a fluid tight seal between the sealing member and the pipe section when the cap member is threaded down on the housing top with the end of pipe section engaging the conical inner surface of the sealing member.

In an embodiment, the sealing member can comprise a polymeric member or ring (e.g., a PTFE or Teflon ring) with an opening wide enough to receive a larger diameter pipe section, but then tapers down to a narrower diameter to capture a smaller diameter pipe section. The sealing member can seal around the end of the pipe section as well as the outside surface of the pipe section toward the top wider opening of the sealing member. In other embodiments, a smaller diameter pipe section can seal in the lower section of the sealing member.

Unlike prior art push fittings which only allow for the insertion of a pipe section into a push fitting to form a seal between the pipe fitting and the pipe section, the pipe connector embodiments of the present disclosure allow for a more active and robust formation of a seal between the pipe connector and the pipe section. For instance, the locking member can be carried inside an upper portion of the cap member by a retaining member. This beneficially holds the locking member in the upper portion of the cap member while the pipe section is inserted through the cap member into the housing body, preventing the locking member from moving with pipe section during and after installation of the pipe section into the housing body. The pipe section is pushed through the cap member and locking member until an end of the pipe section interfaces with or stops against the conical inner surface of the sealing member. The end of the pipe section can comprise a cut-off end with one or more irregularities or any other suitable end type.

As the cap member is tightened down on the housing body (fully or partially) with the end of the pipe section engaging the conical inner surface of the sealing member, the locking member transfers axial forces from the cap member to the pipe section in a downward direction, which, in turn, drive the pipe section downward into the inner conical surface of the sealing member.

When the pipe section moves downward along the conical inner surface of the sealing member, the pipe section exerts both axial forces and radially outward forces on the sealing member, compressing the sealing member between the pipe section and the peripheral wall of the axial bore. This deforms the sealing member and creates a fluid tight seal between the pipe section and the sealing member. Moreover, one or more irregularities in the end of the pipe section or pipe diameter, variations in pipe diameters, or any oval geometry found in the pipe section can be absorbed by the sealing member as it conforms or substantially conforms to the pipe section digging into or pressing against the sealing member. This arrangement beneficially allows the pipe connectors to better withstand the significant pressures refrigerant systems are known to experience.

Additionally, mechanical advantage generated by the action of the cap member threading down on the housing body and the configuration of the locking member drives the pipe section into the sealing member with an amplified force, which, in turn, creates a stronger seal and reinforces the position of the pipe section in the axial bore. This is advantageous over prior art fittings where the installer simply pushes the pipe section into fitting to form the seal between the fitting and the pipe section, resulting in a weaker and less reliable seal especially if the pipe section has irregularities.

According to an embodiment, the sealing member can comprise a polymeric or PTFE ring. Many pipes, like refrigerant pipes, are not concentric. Additionally, refrigerant pipes are typically soft copper and are cut with a tube cutter. A careful examination of the cut-off end often shows a jagged surface with sharp features. Such an inconsistent, unclean cut end is not compatible to seal against a flat sealing member as one might find in prior art fittings. Advantageously, the conical configuration of the sealing member has a relative depth for such a pipe section to pass into the sealing member. This allows for the larger cross sections of pipe to contact the inner surface of the sealing member while the cap member and locking member drive the pipe section further into the sealing member so as to then contact the more narrow cross sectional diameters of the pipe section, which, in turn, can seal the entire circumference of the pipe section within the region of contact between the pipe and the sealing member. This can seal the cut-off end of the pipe section, and the outer surface including the inconsistencies found in the refrigerant pipe.

BRIEF DESCRIPTION OF THE DRAWINGS

These and other features, aspects, and advantages of the present disclosure will become better understood regarding the following description, appended claims, and accompanying drawings.

FIG. 4 is a cross section of the pipe connector shown in FIG. 2 in a first configuration according to an embodiment.

FIG. 5 is a cross section of the pipe connector shown in FIG. 4 in the first configuration, with a pipe section inserted into the housing body.

FIG. 6 is a cross section of the pipe connector shown in FIG. 4 in a second configuration, with the pipe section inserted into the housing body.

FIG. 8 is an exploded view of a pipe connector according to another embodiment.

FIG. 9 is a simplified schematic illustration of a refrigeration system utilizing any of the pipe connectors disclosed herein.

DETAILED DESCRIPTION OF VARIOUS EMBODIMENTS

Figure 1:
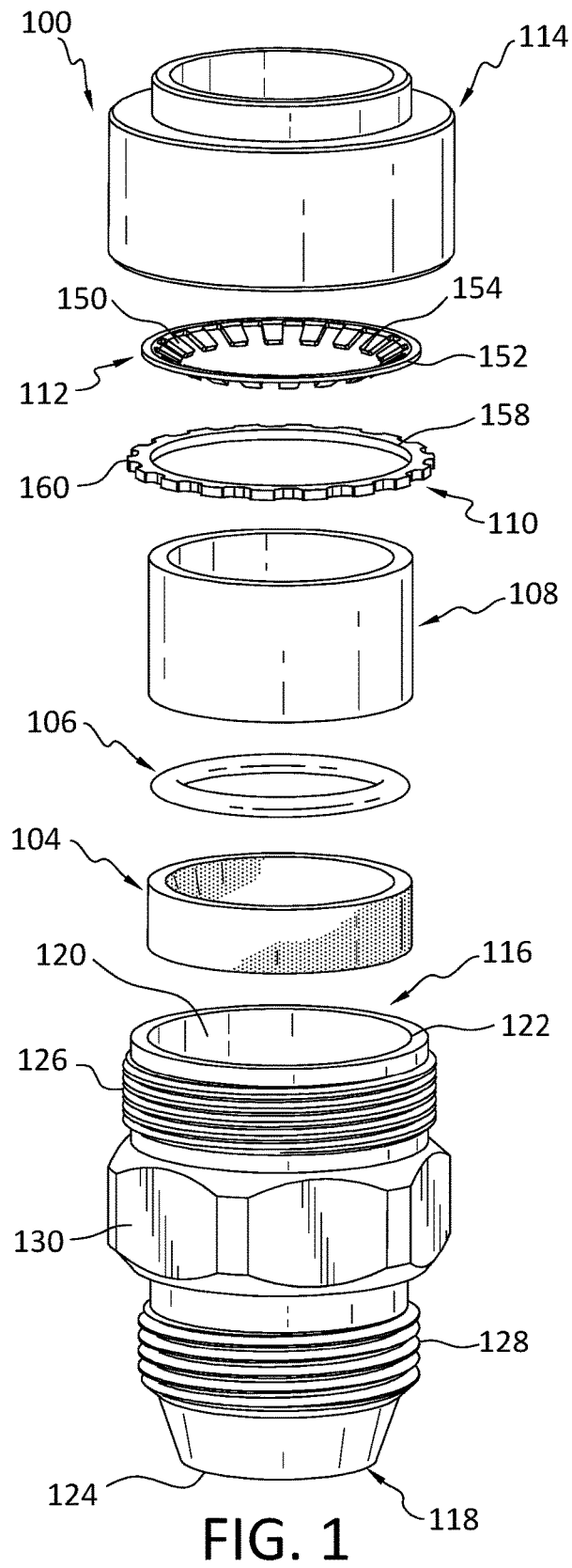
FIG. 1 is an exploded view of a pipe connector according to an embodiment.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning. Any element in a claim that does not explicitly state "means for" performing a specified function, or "step for" performing a specific function is not to be interpreted as a "means" or "step" clause as specified in 35 U.S.C. § 112(f).

Further, the exemplary embodiments of the pipe connectors are generally described being used with copper refrigerant pipes, however, it will be appreciated that the pipe connectors can be used in a number of different applications and with a variety of different types of pipe sections, including, but not limited to, polyvinyl chloride ("PVC") pipes, cross-link polyethylene ("PEX") pipes, iron pipes, steel pipes, brass pipes, aluminum pipes, rubber pipes, flexible pipes, or any other suitable type of pipe. Moreover, the term "pipe" can mean a pipe, a tube, a hose, a line, and/or any other conduit.

Figure 2:
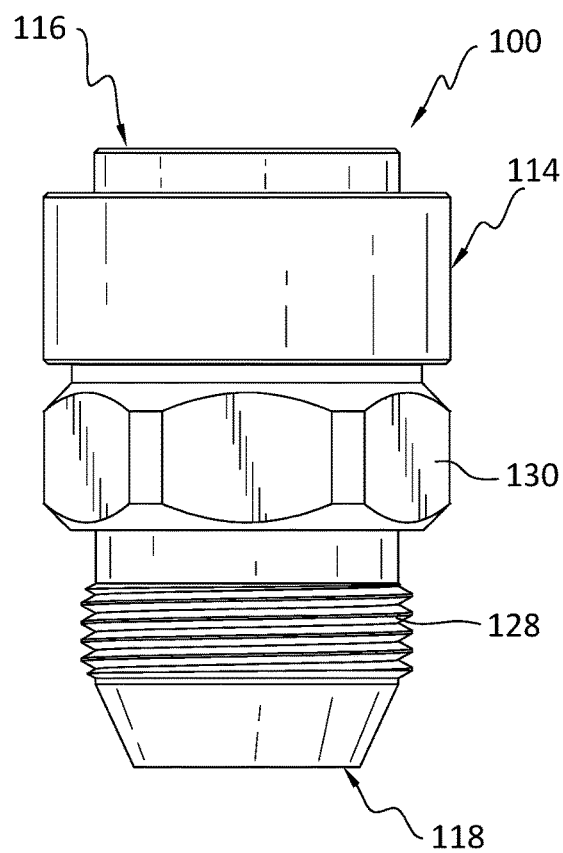
FIG. 2 is a side view of the pipe connector shown in FIG. 1 in assembled form.

With reference to FIGS. 1-6, an exemplary embodiment of a pipe connector comprises a push fitting 100 including a housing body 102, a sealing member 104, a secondary sealing member 106, a sleeve member 108, a retaining member 110, a locking member 112, and a cap member 114. As seen in FIGS. 1 and 2, the housing body 102 can include a housing top 116, a housing bottom 118, and an axial bore 120 extending between the housing top 116 and the housing bottom 118. The axial bore 120 includes a top opening 122 located at or adjacent to the housing top 116 and a bottom opening 124 located at or adjacent to the housing bottom 118. This arrangement can allow fluid to flow through the housing body 102. In other embodiments, the push fitting 100 can be configured as a cap member or a plug with the housing bottom 118 defining a closed bottom of the axial bore 120 arranged to prevent fluid through the housing body 102. The axial bore 120 can have any desired shape but is shown in having a generally circular or cylindrical shape.

The housing body 102 can include one or more features for connecting the housing body 102 to the cap member 114 and/or other components. For example, the housing body 102 can include an upper threaded portion 126 located toward the housing top 116 and a lower threaded portion 128 located towards the housing bottom 118. The upper threaded portion 126 can facilitate attachment of the cap member 114 to the housing body 102 (shown in FIG. 2). The lower threaded portion 128 can facilitate different types of connections. For instance, the lower threaded portion 128 can facilitate connection of the housing body 102 to a barbed attachment assembly and a ferrule.

Optionally, the housing body 102 may include wrench flats 130 disposed about the outer periphery of the housing body 102. The wrench flats 130 can be arranged to receive a wrench or other tool for rotating the push fitting 100 or resisting rotation of the push fitting 100 as needed. The wrench flats 130 can also be used to connect, disconnect, assemble, tighten, and/or disassemble the push fitting 100. The housing body 102 can be formed of a metal material or any other suitable material. It will be appreciated that the construction of the housing body 102 can be dependent on a number of different factors, such as the anticipated size and/or type of pipe inserted in the push fitting 100, the type of connection to be made, the anticipated operating pressure, fluid type, user preference, and/or other factors.

Figure 3:
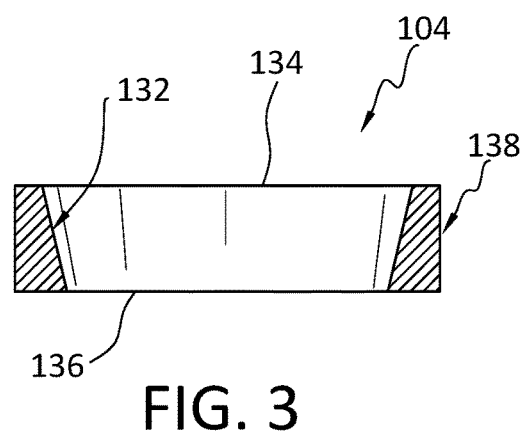
FIG. 3 is a cross section of the sealing member shown in FIG. 1.

The sealing member 104 is positionable in the axial bore 120 of the housing body 102 and can be seated in the housing body 102 toward the housing bottom 118. Referring to FIG. 3, the sealing member 104 can include an inner surface 132 having a conical configuration that tapers in a direction toward the housing bottom 118. For example, the inner surface 132 of the sealing member 104 can include an upper opening 134 sufficiently wide to receive a larger diameter pipe section, and then can taper down toward a lower opening 136 configured to capture a smaller diameter pipe section. As discussed below, the sealing member 104 can seal around an end of the pipe section and the outer surface of the pipe section. The end of the pipe section can comprise a cut-off end of the pipe section having irregularities or any other suitable end type.

Also, the conical configuration of the inner surface 132 can form a seal between the sealing member 104 and a larger diameter pipe section toward the upper opening 134 and can form a seal between the sealing member 104 and a smaller diameter pipe section toward the lower opening 136. An outer surface 138 of the sealing member 104 can have any suitable configuration but is shown having a cylindrical shape. The sealing member 104 can be formed of a polymeric material, a hard-plastic material, or any other suitable material.

FIG. 4 shows a cross section of the push fitting 100 for ease of reference. The axial bore 120 can define a shoulder 140 or abutment toward the housing bottom 118. The sealing member 104 is positionable in the axial bore 120 such that the sealing member 104 is seated or supported on the shoulder 140 within the axial bore 120.

Optionally, the secondary sealing member 106 is positionable in the axial bore 120 above the sealing member 104. The secondary sealing member 106 can be configured to form a redundant seal between the pipe section 30 and the push fitting 100 if the sealing member 104 fails or the seal fails between the sealing member 104 and the pipe section 30. For example, the sealing member 104 can be configured to fail at a first pressure (e.g., between about 1700 and about 1800 psi) and the secondary sealing member 106 can be configured to fail at a second pressure (e.g., about 2600 psi) greater than the first pressure. If the sealing member 104 breaks or the seal between the sealing member 104 and the pipe section 30 breaks, the secondary sealing member 106 advantageously allows the push fitting 100 to hold pressure up to the second pressure of the secondary sealing member 106, improving safety and performance of the push fitting 100.

As seen, the sleeve member 108 is positionable in the axial bore 120 above the sealing member 104. In an embodiment, the sleeve member 108 is positionable in the axial bore 120 so that the secondary sealing member 106 is located between the sleeve member 108 and the sealing member 104. The sleeve member 108 is configured to help guide the pipe section 30 through the push fitting 100, including the secondary sealing member 106, and into a first stop point L1 (shown in FIG. 5) on the conical inner surface 132 of the sealing member 104. The sleeve member 108 can also help prevent the secondary sealing member 106 from being forced or backed out of the axial bore 120 of the housing body 102 when the push fitting 100 is under pressure. The sleeve member 108 can be formed of a polymer material or another suitable material.

The cap member 114 is attachable to the housing top 116 and arranged to selectively retain the sealing member 104 in the axial bore 120. In an embodiment, the cap member 114 can include an internally threaded portion 144 arranged to threadedly connect to the upper threaded portion 126 of the housing body 102. The cap member 114 thus can be placed on the housing top 116 and threaded onto and unthreaded from the housing body 102. The cap member 114 defines an opening 146 arranged to receive an end of the pipe section 30. The end of the pipe section 30 can comprise a cut-off end of the pipe section having irregularities or any other suitable end type.

Optionally, the cap member 114 includes a pipe alignment feature configured to help guide the pipe section 30 through the axial bore 120. In an embodiment, the pipe alignment feature comprises an annular guide 148 surrounding the opening 146. The annular guide 148 can help limit unwanted movement of the pipe section 30 by directing the pipe section 30 into the axial bore 120 in an axial direction.

The cap member 114 is configured to carry the locking member 112 in the cap member 114. In an embodiment, the locking member 112 is retained inside of an upper portion of the cap member 114 by the retaining member 110 positioned in a retaining groove 156 defined in an inner surface of the cap member 114. This retaining member 110 beneficially holds the locking member 112 in the cap member 114 while the pipe section 30 is inserted through the cap member 114 into the axial bore 120, preventing the locking member 112 from moving with the pipe section 30.

The locking member 112 can interface with the pipe section 30 to form a one-way stop in the push fitting 100. For example, the locking member 112 can interface with the pipe section 30 such that the pipe section 30 can be inserted into the housing body 102 but not withdrawn. Also, the locking member 112 can interface with the outer surface of the pipe section 30 such that movement of the locking member 112 toward the sealing member 104 grips and drives the pipe section 30 in an axial direction toward the sealing member 104.

In the illustrated embodiment, the locking member 112 comprises a plurality of teeth 150 extending radially inward from a ring 152 and terminating at ends 154 arranged to engage the outer surface of the pipe section 30 to form a one-way stop when the pipe section 30 is received in the axial bore 120. The teeth 150 can be arranged in a generally frusto-conical array. The teeth 150 can be deformable, bendable, and/or flexible and may deform, pivot or flex radially or inwardly during use of the push fitting 100 when the pipe section 30 is inserted into the axial bore 120. The teeth 150 may comprise one, two, four, ten, twenty, or any other suitable number of teeth. The ends 154 of the teeth 150 when engaged with the pipe section 30 can restrict translation of the pipe section 30 relative to the axial bore 120 when the pipe section 30 is moved in any direction tending to remove the pipe section 30 from the axial bore 120. The end 154 of one or more of the teeth 150 can include a sharpened edge and/or point. The locking member 112 can be formed of any suitable material. The teeth 150 can be formed from a material that is deformable and harder than the pipe section 30. It will be appreciated that the locking member 112 is shown including the teeth 150 but can include any suitable locking feature.

In an embodiment, the push fitting 100 is movable between a receiving configuration (shown in FIG. 4) in which a gap G is defined between the housing top 116 and the locking member 112 carried in the cap member 114, and a sealing configuration (shown in FIG. 6) in which the locking member 112 is moved toward the housing top 116 to close or reduce the gap G. The push fitting 100 can be moved from the receiving configuration toward the sealing configuration by threading the cap member 114 down on the housing body 102 with the end of the pipe section 30 engaging the conical inner surface 132 of the sealing member 104 in the axial bore 120, which, in turn, causes the locking member 112 to drive the pipe section 30 downward along the conical inner surface 132 of the sealing member 104. The downward movement of the pipe section 30 along the conical inner surface 132 of the sealing member 104 increases the contact surface area between the pipe section 30 and the sealing member 104 and deforms the sealing member 104 between the pipe section 30 and a peripheral wall 142 of the axial bore 120, creating at least one fluid tight seal with sealing member 104 in the axial bore 120.

In use, the cap member 114 can be partially threading on the housing top 116 of the housing body 102 as shown in FIG. 4. For example, a user can move the push fitting 100 into the receiving configuration by partially threading the cap member 114 on the housing top 116 such that the gap G is defined between the housing top 116 of the locking member 112. As shown in FIG. 5, the user can then insert the pipe section 30 into the housing body 102 through the cap member 114 and the locking member 112 until an end of the pipe section 30 interfaces with or engages the conical inner surface 132 of the sealing member 104. As discussed above, the opening 146 can centralize the movement of the pipe section 30 within the axial bore 120.

In an embodiment, the pipe section 30 slides through the cap member 114 and the locking member 112 carried in the cap member 114, towards the sealing member 104 in the axial bore 120. From the cap member 114, the pipe section 30 advances through the axial bore 120, where the pipe section 30 passes through the sleeve member 108, which directs the pipe section 30 toward the sealing member 104 until the end of the pipe section 30 interfaces with or engages the conical inner surface 132 of the sealing member 104 at a first stop point L1. According to a variation, the first stop point L1 can provide a stop or limit movement of the pipe section 30 within the axial bore 120. This advantageously can temporarily support the end of the pipe section 30 in the axial bore 120 and offer an index or indicator so that the user can tell when the pipe section 30 is engaged with the sealing member 104. Because of the conical configuration of the inner surface 132, the location of the first stop point L1 can vary based on the diameter of the pipe section 30. For instance, the first stop point L1 on the sealing member 104 will be closer to the housing bottom 118 with a smaller diameter pipe section 30 than with a larger diameter pipe section 30.

With the pipe section 30 inserted into the axial bore 120 through the cap member 114 and the locking member 112, any axial movement of the pipe section 30 tending to withdraw the pipe section 30 from the axial bore 120, will result in the teeth 150 biting or engaging the outer surface of the pipe section 30 to effectively lock the pipe section 30 in the push fitting 100. For instance, axial movement of the pipe section 30 tending to withdraw the pipe section 30 from the axial bore 120, can cause the teeth 150 of the locking member 112 to bend upward and toward the apex or ring 152 of the locking member 112. By so doing, the pipe section 30 pushes the teeth 150 radially outward, which, in turn, forces the outer diameter of the locking member 112 to expand radially. As the outer diameter of the locking member 112 increases, the locking member 112 can become wedged between the pipe section 30 and the cap member 114, forcing the teeth 150 to become even more engaged with the pipe section 30.

Referring to FIG. 6, the user can tighten the cap member 114 down on the housing body 102 such that the locking member 112 grabs the pipe section 30 and drives the end of the pipe section 30 downward along the conical inner surface 132 of the sealing member 104, deforming the sealing member 104 and creating a fluid tight seal between the sealing member 104 and the pipe section 30. For instance, the user can move the push fitting 100 from the receiving configuration toward the sealing configuration with the end of the pipe section 30 engaging the conical inner surface 132 of the sealing member 104, which, in turn, closes or reduces the gap G between the locking member 112 and the housing top 116.

As the cap member 114 is tightened onto the housing top 116, the locking member 112 grips the outer surface of the pipe section 30 and transfers axial forces from the cap member 114 to the pipe surface in a downward direction, which, in turn, drives the pipe section 30 downward into the conical inner surface 132 of the sealing member 104. For instance, the locking member 112 can drive the end of the pipe section 30 from the first stop point L1 toward a second stop point L2 (shown in FIG. 6). The travel distance of the pipe section 30 between the first stop point L1 and the second stop point L2 can be controlled by varying the size of the gap G between the locking member 112 and the housing top 116. For instance, a larger gap G can allow for a larger travel distance along the conical inner surface 132 between the first stop point L1 and the second stop point L2.

When the pipe section 30 is driven downward along the conical inner surface 132 of the sealing member 104 by the locking member 112, the pipe section 30 exerts axial forces on the sealing member 104 and radially outward forces on the sealing member 104. This increases the contact area between the outer surface of the pipe section 30 and the sealing member 104. For instance, the contact surface area between the outer surface of the pipe section 30 and the sealing member 104 can increase as the end of the pipe section 30 moves downward along the conical inner surface 132.

The axial forces and the radially outward forces from the pipe section 30 also deform the sealing member 104 between the pipe section 30 and the peripheral wall 142 of the axial bore 120, creating a fluid tight seal between the pipe section 30 and the sealing member 104. Moreover, one or more irregularities in the end of the pipe section 30 or pipe diameter, variations in pipe diameters, or any oval geometry found in the pipe section 30 can be absorbed by the sealing member 104 as it conforms or substantially conforms to the pipe section 30 digging into or pressing against the sealing member 104. This arrangement beneficially allows the push fitting 100 to better withstand the significant pressures refrigerant systems are known to experience.

Additionally, the mechanical advantage generated by the action of the cap member 114 threading down on the housing body 102 and the configuration of the locking member 112 drives the pipe section 30 into the sealing member 104 with an amplified force, which, in turn, creates a stronger seal and reinforces the pipe section 30 against the sealing member 104 pushing the pipe section 30 away from the sealing member 104. This is advantageous over prior art push fittings where the user simply pushes the pipe section into fitting to form the seal between the fitting and the pipe section, resulting in a weaker and less reliable seal especially if the pipe section has irregularities in the end of the pipe section, variations in pipe diameters, or any oval geometry found in the pipe section.

According to an embodiment, one or more barbed elements 162 are defined in the axial bore 120 at or near the shoulder 140 along the peripheral wall 142 of the axial bore 120. The one or more barbed elements 162 are configured to interface with the outer surface 138 of the sealing member 104 and can extend entirely or partially circumferentially around the axial bore 120. The one or more barbed elements 162 help create a sealing interface and mechanical lock between the sealing member 104 and the housing body 102, increasing the sealing strength of the push fitting 100. In an embodiment, a seal between the outer surface 138 of the sealing member 104 and the housing body 102 can be formed as the push fitting 100 moves from the receiving configuration toward the sealing configuration. For instance, axial forces created by action of the cap member 114 being threaded down on the housing top 116 can be transferred to the pipe section 30 via the locking member 112, which, in turn, drives the pipe section 30 downward into the sealing member 104.

As discussed above, when the pipe section 30 moves downward along the conical inner surface 132 of the sealing member 104, the pipe section 30 can exert radial outward forces on the sealing member 104. These forces can drive the sealing member 104 outward against the one or more barbed elements 162, creating a fluid tight seal between the outer surface 138 of the sealing member 104 and the peripheral wall 142 of the housing body 102, helping the push fitting 100 prevent or limit leaks through the axial bore 120.

The one or more barbed elements 162 can also create a mechanical lock with the outer surface of the sealing member 104. This can help secure or hold the sealing member 104 in the axial bore 120. For example, the one or more barbed elements 162 are arranged to create a smaller or slightly smaller diameter than the outer surface 138 of the sealing member 104 when the sealing member 104 is forced into a resting position within the housing body 102 on the shoulder 140, creating a mechanical lock between the one or more barbed elements 162 and the sealing member 104. In an embodiment, the sealing member 104 can be forced into the resting position in the axial bore 120 during assembly of the push fitting 100.

In an embodiment, the one or more barbed elements 162 can include a sharpened edge arranged to dig or cut into the outer surface 138 of the sealing member 104 in a circumferential direction, which, in turn, facilitates the mechanical lock and sealing interface between the housing body 102 and the sealing member 104. The one or more barbed elements 162 can include a geometry configured to allow one directional movement of the sealing member 104 toward the shoulder 140 but prohibits or limits movement of the sealing member 104 away from the shoulder 140 or in a reverse direction in the axial bore 120.

In an embodiment, the retaining member 110 can comprise a keeper ring having a planar or flat configuration with a ring portion 158 and a plurality of fingers 160 extending radially outward from the ring portion 158. The retaining member 110 can be formed of a polymer material, a metal material, combinations thereof, or any other suitable material. The retaining member 110 can have a flexible configuration and an outer diameter that is smaller than a diameter of the retaining groove 156 of the cap member 114. For instance, the plurality of fingers 160 can define the outer diameter of the keeper ring that interfaces with the smaller diameter of the retaining groove 156 so that the keeper ring does not rest in a flat plane within the cap member 114 but instead the smaller diameter of the retaining groove 156 deflects the fingers 160 upwardly, which, in turn, force the ring portion 158 of the keeper ring in an upward direction toward the top of the cap member 114. This holds both the retaining member 110 and the locking member 112 in place while the pipe section 30 is inserted through the locking member 112 and the retaining member 110. The keeper ring can have a resilient configuration so that the keeper ring can flex past the inner threads on the cap member 114 and into the retaining groove 156. The resilient configuration of the keeper ring can also have sufficient strength so that the keeper ring in the retaining groove 156 can hold the keeper ring and the locking member 112 in position when the pipe section 30 is pushed axially through the locking member 112 and the keeper ring. While the retaining member 110 is described as a keeper ring, in other embodiments, the retaining member 110 can comprise a snap ring or any other suitable retaining member.

The push fitting 100 can thus be securely and sealingly attached to the pipe section 30 without the need of soldering, substantially improving the safety and amount of time required to connect the push fitting 100. Further, the strength and reliability of the connection between the pipe section and the sealing member is improved over the prior art.

Figure 7:
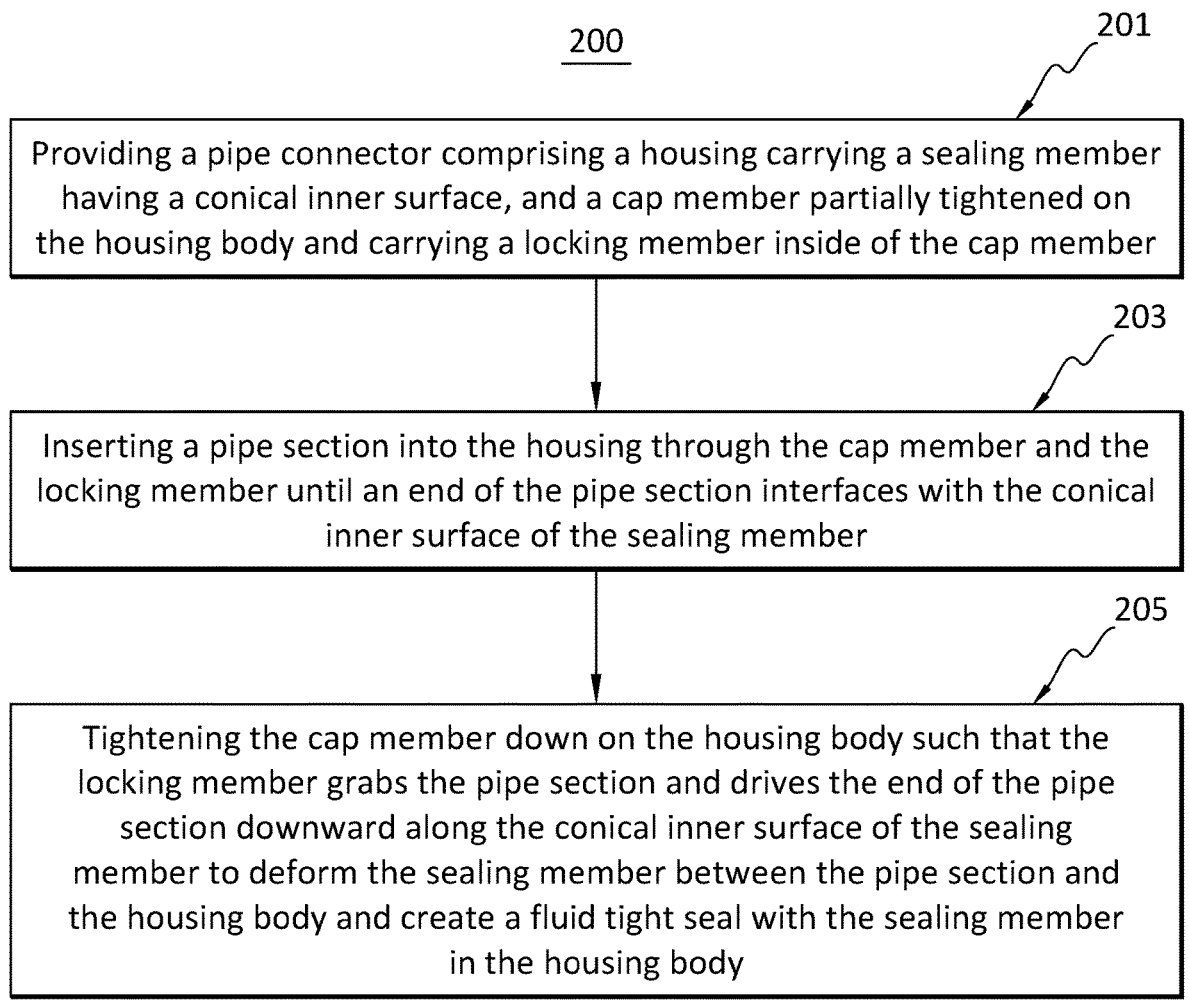
FIG. 7 is an overview of the steps in an embodiment of connecting the pipe connector to a pipe section.

One will appreciate that embodiments of the present disclosure can also be described in terms of flowcharts including one or more steps for accomplishing a particular result. For example, the steps in FIG. 7 illustrate a method 200 in accordance with the present disclosure for a making a pipe connection which includes the step 201 of providing a pipe connector comprising a housing body carrying a sealing member having a conical inner surface, and a cap member partially tightened on the housing body and carrying a locking member inside of the cap member. Step 201 can include partially threading the cap member down onto the housing body such that a gap is defined between a housing top of the housing body and the locking member. The sealing member can be positioned in an axial bore of the housing body toward a housing bottom.

The method 200 can include a step 203 of inserting a pipe section into the housing body through the cap member and the locking member until an end of the pipe section interfaces with the conical inner surface of the sealing member. Step 203 can include inserting the pipe section into the housing body through the cap member and the locking member until the end of the pipe section interfaces with an inner surface of the sealing member at a first stop point configured to provide a stop or limit movement within the housing body.

Additionally, FIG. 7 shows that the method 200 can include a step 205 of tightening the cap member down the housing body such that the locking member grabs the pipe section and drives the end of the pipe section downward along the conical inner surface of the sealing member to deform the sealing member and create a fluid tight seal between the sealing member and the pipe section.

Step 205 can include tightening the cap member further down on the housing body, which, in turn, transfers axial forces downward to the pipe section via the locking member. The locking member in turn drives the pipe section downward along the conical inner surface of the sealing member, which, in turn, exerts axial forces in a downward direction on the sealing member and radial outward forces perpendicular to the axial forces on the sealing member. The axial forces can increase the contact surface area between the pipe section and the sealing member. For instance, the contact surface area between the pipe section and the sealing member can increase as the end of pipe section moves downward along the conical inner surface of the sealing member.

The radially outward forces exerted on the sealing member by the pipe section can drive the sealing member outward against the one or more barbed elements, compressing the sealing member between the pipe section and the one or more barbed elements. This forced interaction creates a fluid tight seal between the pipe section, the sealing member and the housing body, helping the push fitting prevent or limit leaks. In an embodiment, the fluid tight seal can withstand between about 1600 psi to about 2000 psi (e.g., about 1800 psi) of fluid pressure. This beneficially can help prevent leaks in air conditioning systems which typically do not exceed an operating pressure of 500 psi. FIG. 8 shows a pipe connector comprising a push fitting 300 according to another embodiment. The push fitting 300 can be similar to the push fitting 100. The push fitting 300 can include a housing body 302, a sealing member 304, a retaining member 310, a locking member 312, and a cap member 314.

The sealing member 304 is positionable in an axial bore 320 of the housing body 302 and can be seated in the housing body 302 toward a bottom of the housing body 302. Like the sealing member 104, the sealing member 304 can include an inner surface 332 having a conical configuration that tapers in a direction toward the housing bottom. An outer surface 338 of the sealing member 304 is shown having a conical configuration but can have any suitable configuration for interfacing with the peripheral wall of the axial bore 320. The sealing member 304 can be formed of any suitable material.

The cap member 314 is attachable to the housing body 302 and arranged to selectively retain the sealing member 304 in the axial bore 320. The cap member 314 can be placed on a top of the housing body 302 and threaded onto and unthreaded from the housing body 302. The cap member 314 defines an opening 346 arranged to receive an end of a pipe section.

The locking member 312 is carried in the cap member 314. For instance, the locking member 312 can be retained inside of an upper portion of the cap member 314 by the retaining member 310. The retaining member 310 can comprise a snap ring positioned within the cap member 314. This beneficially holds the locking member 312 in the cap member 314 while the pipe section is inserted through the cap member 314 into the housing body 302, preventing the locking member 312 from moving with the pipe section.

Like in other embodiments, the locking member 312 is arranged to interface with an outer surface of the pipe section to form a one-way stop in the push fitting 300. For example, the locking member 312 can interface with the outer surface of the pipe section so that the pipe section can be inserted into the housing body 302 but not withdrawn. Also, the locking member 312 can interface with the outer surface of the pipe section such that movement of the locking member 312 toward the sealing member 304 grips the outer surface of the pipe section and drives the pipe section toward the sealing member 304. The locking member 312 can comprise a grip ring or any other suitable locking member.

In use, the cap member 314 can be partially tightened on the housing body 302. A pipe section can then be inserted into the axial bore 320 of the housing body 302 through the cap member 314 and the locking member 312 until an end of the pipe section interfaces with the conical inner surface of the sealing member 304. The cap member 314 can then be tightened further down on the housing body 302 such that the locking member 312 grabs the outer surface of the pipe section and drives the pipe section along the conical inner surface 332 to deform the sealing member 304 and create a fluid tight seal between the sealing member 304 and the pipe section. This interaction between the outer surface of the pipe section and the conical inner surface 332 increases the contact surface area between the pipe section and the sealing member 304 and compresses the sealing member 304 between the pipe section and the peripheral wall of the axial bore. For instance, the contact surface area between the pipe section and the sealing member 304 can increase as the end of pipe section moves downward along the conical inner surface 332 of the sealing member 304, improving the reliability of the seal formed therebetween.

Moreover, one or more irregularities in the end of the pipe section, variations in pipe diameters, or any oval geometry found in the pipe section can be absorbed by the sealing member 304 as it conforms or substantially conforms to the pipe section digging into or pressing against the sealing member 304. This arrangement beneficially allows the push fitting 300 to better withstand the significant pressures refrigerant systems are known to experience.

Additionally, mechanical advantage generated by the action of the cap member 314 threading down on the housing body 302 and the configuration of the locking member 312 drives the pipe section into the sealing member 304 with an amplified force, which, in turn, creates a stronger seal and reinforces the pipe section against the sealing member 304 pushing the pipe section away from the sealing member 304.

An exemplary refrigeration or air conditioning system 400 utilizing any of the pipe connectors disclosed herein is illustrated in FIG. 9. The air conditioning system 400 can include an indoor unit 403 located inside of a building 405 and an outdoor unit 407 located outside of the building 405. A first pipe 409 arranged to convey gaseous refrigerant and a second pipe 411 arranged to convey liquid refrigerant can be connected to the indoor unit 403. The first and second pipes 409, 411 can extend from the indoor unit 403 through the wall of the building 405. A third pipe 413 arranged to convey gaseous refrigerant and a fourth pipe 415 arranged to convey liquid refrigerant can be connected to the outdoor unit 407.

The first pipe 409 can be fluidly connected to the third pipe 413 via a first pipe connector 417 and the second pipe 411 and the fourth pipe 415 can be fluidly connected via the second pipe connector 419. The pipe connectors 417, 419 can be any of the pipe connectors disclosed herein. This advantageously allows the outdoor unit 407 to be operatively connected to the indoor unit 403 in a less hazardous and efficient manner. For example, the outdoor unit 407 can be operatively connected to the indoor unit 403 without having to use a soldering torch or flame to solder the respective lengths of the pipes next to the wall of the building 405. Moreover, the pipe connectors 417, 419 can be easily installed by inserting the pipes in the pipe connectors 417, 419 and tightening their cap members down on the pipe connectors 417, 419.

Moreover, the construction of the connectors 417, 419 can be configured to account for a number of different factors, such as the sizes of the liquid and gaseous refrigerant lines, the anticipated operating temperature of the air conditioning system 400, and/or other factors. Further, the air conditioning system 400 may include the use/installation of a plurality of pipe connectors. For example, a pipe connector may be used to connect the gaseous refrigerant pipe to the indoor unit 403 and another pipe connector to connect the same gaseous refrigerant pipe to the outdoor unit 407.

The same principles can apply to the liquid refrigerant line. For instance, a pipe connector may be used to connect the liquid refrigerant line to the indoor unit 403 and another connector may be used to connect the same liquid refrigerant line to the outdoor unit 407. It will be appreciated that each refrigerant line (liquid or gaseous) may include the use of one, two, three, five, or any other suitable number of pipe connectors throughout as installation may require.

While the connectors are illustrated connecting copper pipes of an air conditioning system, it will be appreciated that the connectors can be utilized in any number of different applications and with a variety of different types of pipes.

Although a single locking member is described, other numbers of locking members are possible, including two, three, four, or any other suitable number. For instance, the pipe connector can be configured as a slip-slip connector arranged to connect two lengths of unthreaded pipes together with a first locking member located toward the housing top and another locking member located toward the housing bottom.

While the housing body is shown including a cylindrical configuration, in other embodiments, the housing body can include a generally elliptical, generally triangular, generally square, generally rectangular, generally polygonal, other shapes having arcuate and/or linear portions, combinations thereof, or any other suitable configuration. It will be appreciated that in other embodiments the axial bore can have a varying diameter, a constant diameter and/or can exhibit any suitable configuration. While the openings in the cap member are shown being centrally located, in other embodiments, the openings can be non-central or located toward one side or another of the cap member.

It will be appreciated that the pipe connectors of the present disclosure can exhibit any suitable configuration. For instance, the pipe connector can be configured as a tee, a union, a coupling, an elbow, or any other suitable type of connector. The pipe connector may be a stand-alone component or may be integral with or attached to other components, such as, for example, a valve, a tank, a regulator, or any other suitable device. While the inner surface of the sealing member is described as having a conical configuration, in other embodiments, the inner surface of the sealing member can have any suitable configuration that allows the pipe section to exert axial forces and radially outward forces on the sealing member. For instance, the inner surface can have a stepped configuration, a trapezoidal configuration, a convex configuration, an oval configuration, combinations thereof, or any other suitable configuration. In other embodiments, a pipe connector system can include one or more pipe connectors of the present disclosure and one or more pipe sections.

The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A pipe connector comprising:
   a housing body defining a housing top, a housing bottom, and an axial bore extending between the housing top and the housing bottom, the axial bore arranged to receive a pipe section having an end;
   a sealing member seated in the axial bore toward the housing bottom, the sealing member having a conical inner surface tapering toward the housing bottom and configured to interface with the end of the pipe section, wherein the sealing member is seated on a shoulder defined in the axial bore toward the housing bottom;
   a cap member threadedly attachable to the housing top and defining an opening for allowing the end of the pipe section to pass through the cap member into the axial bore; and
   a locking member retained in the cap member with a gap defined between the housing top and the locking member when the cap member is partially threaded on the housing body, the locking member configured such that the pipe section is only movable through the locking member in a direction toward the sealing member,
   wherein the locking member interfaces with the pipe section to drive the pipe section downward along the conical inner surface and create a fluid tight seal between the sealing member and the pipe section when the cap member is threaded down on the housing body with the end of pipe section engaging the conical inner surface of the sealing member.

2. The pipe connector of claim 1, wherein the downward movement of the end of the pipe section along the conical inner surface increases a contact surface area between the pipe section and the sealing member and compresses the sealing member between the pipe section and the housing body to create the fluid tight seal.

3. The pipe connector of claim 1, wherein the locking member transfers downward axial forces to the pipe section when the cap member is threaded down on the housing body that drive the pipe section downward along the conical inner surface of the sealing member.

4. The pipe connector of claim 1, further comprising one or more barbed elements defined in the axial bore at or near the shoulder along a peripheral wall of the axial bore, the one or more barbed elements configured to create a sealing interface between an outer surface of the sealing member and the peripheral wall.

5. The pipe connector of claim 1, further comprising a retaining member holding the locking member in the cap member.

6. The pipe connector of claim 5, wherein the retaining member is positioned in a retaining groove defined in the cap member.

7. The pipe connector of claim 5, wherein the retaining member comprises a keeper ring.

8. The pipe connector of claim 5, wherein the retaining member comprises a snap ring.

9. The pipe connector of claim 1, further comprising a sleeve member positionable in the axial bore above the sealing member, the sleeve member configured to guide the pipe section through the axial bore toward the sealing member.

10. The pipe connector of claim 9, further comprising a secondary sealing member positioned between the sealing member and the sleeve member.

11. The pipe connector of claim 10, wherein the sleeve member is configured to prevent the secondary sealing member from being backed out of the axial bore.

12. The pipe connector of claim 1, wherein the pipe connector is movable between a receiving configuration in which a gap is defined between the locking member and the housing top, and sealing configuration in which the cap member and the locking member are moved toward the housing top to reduce the gap and to drive the end of the pipe section downward along the conical inner surface of the sealing member.

13. The pipe connector of claim 1, wherein the end of the pipe section includes one or more irregularities absorbed by the inner conical surface of the sealing member.

14. The pipe connector of claim 1, wherein a diameter of the pipe section includes one or more irregularities absorbed by the inner conical surface of the sealing member.

15. A pipe connector system comprising:
   a pipe section having an end; and
   a pipe connector comprising:
      a housing body defining a housing top, a housing bottom, and an axial bore extending between the housing top and the housing bottom, the axial bore arranged to receive the pipe section;
      a sealing member seated on a shoulder in the axial bore toward the housing bottom, the sealing member having a conical inner surface tapering toward the housing bottom and configured to interface with the end of the pipe section;
      a cap member threadedly attachable to the housing top and defining an opening configured to allow the end of the pipe section to pass through the cap member into the axial bore of the housing body;
      a locking member carried inside of the cap member and configured to interact with an outer surface of the pipe section such that the pipe section is only movable through the locking member in a direction toward the sealing member, wherein when the cap member is threaded down on the housing top with the end of pipe section engaging the conical inner surface of the sealing member the locking member interfaces with the pipe section to drive the pipe section downward along the conical inner surface to create a fluid tight seal between the sealing member and the pipe section; and
      one or more barbed elements defined in the axial bore at or near the shoulder along a peripheral wall of the axial bore, the one or more barbed elements configured to create a sealing interface between an outer surface of the sealing member and the peripheral wall.

16. The pipe connector system of claim 15, wherein the locking member is retained in the cap member by a retaining member positioned in a retaining groove defined in the cap member.

17. A pipe connector comprising:
   a housing body defining a housing top, a housing bottom, and an axial bore extending between the housing top and the housing bottom, the axial bore arranged to receive a pipe section having an end;
   a sealing member seated in the axial bore toward the housing bottom, the sealing member having a conical inner surface tapering toward the housing bottom and configured to interface with the end of the pipe section;
   a sleeve member postionable in the axial bore above the sealing member, the sleeve member configured to guide the pipe section through the axial bore toward the sealing member;
   a cap member threadedly attachable to the housing top and defining an opening for allowing the end of the pipe section to pass through the cap member into the axial bore; and
   a locking member carried by the cap member and configured such that the pipe section is only movable through the locking member in a direction toward the sealing member, wherein the locking member interfaces with the pipe section to drive the pipe section downward along the conical inner surface and create a fluid tight seal between the sealing member and the pipe section when the cap member is threaded down on the housing body with the end of pipe section engaging the conical inner surface of the sealing member.

18. The pipe connector of claim 17, further comprising a secondary sealing member positioned between the sealing member and the sleeve member.

19. The pipe connector of claim 18, wherein the sleeve member is configured to prevent the secondary sealing member from being backed out of the axial bore.

* * * * *